(12) United States Patent
Balogh

(10) Patent No.: US 7,801,831 B2
(45) Date of Patent: Sep. 21, 2010

(54) SYSTEMS AND METHODS TO COLLECT AND AUGMENT DECEDENT DATA

(75) Inventor: James A. Balogh, Rancho Sante Fe, CA (US)

(73) Assignee: Forte, LLC, Minneapolis, MN (US)

( * ) Notice: Subject to any disclaimer, the term of this patent is extended or adjusted under 35 U.S.C. 154(b) by 1216 days.

(21) Appl. No.: 11/321,402

(22) Filed: Dec. 29, 2005

(65) Prior Publication Data

US 2007/0156417 A1 Jul. 5, 2007

(51) Int. Cl.
*G06F 17/30* (2006.01)

(52) U.S. Cl. .................................. 705/311

(58) Field of Classification Search ............ None
See application file for complete search history.

(56) References Cited

U.S. PATENT DOCUMENTS

| | | | |
|---|---|---|---|
| 6,629,132 B1* | 9/2003 | Ganguly et al. ............ 709/213 |
| 6,745,177 B2* | 6/2004 | Kepler et al. ................... 1/1 |
| 2001/0049676 A1* | 12/2001 | Kepler et al. ................ 707/3 |
| 2002/0002550 A1* | 1/2002 | Berman ....................... 707/3 |
| 2002/0072925 A1* | 6/2002 | Krim ........................... 705/1 |
| 2002/0077972 A1 | 6/2002 | Wilwerding et al. |
| 2003/0182290 A1* | 9/2003 | Parker ..................... 707/100 |
| 2005/0060643 A1* | 3/2005 | Glass et al. ............. 715/501.1 |
| 2007/0078665 A1* | 4/2007 | Dodson et al. ................ 705/1 |

OTHER PUBLICATIONS

Private Eye, "Public Records Now," Jan. 31, 2005, used Way Back Machine (www.archive.org) to retrieve website for Jan. 31, 2005., pp. 1-4.*
Owner Controlled Information BY Carrie Gates and Jacob Slonim. ACM 2004.*

* cited by examiner

*Primary Examiner*—Neveen Abel Jalil
*Assistant Examiner*—Frahan Syed
(74) *Attorney, Agent, or Firm*—Schwegman, Lundberg & Woessner, P.A.

(57) ABSTRACT

Systems, methods, and software to collect, validate, and disseminate or otherwise use of data of decedents. Some embodiments include receiving and obtaining decedent data from various sources to augment decedent data and making the augmented decedent data available to others.

17 Claims, 4 Drawing Sheets

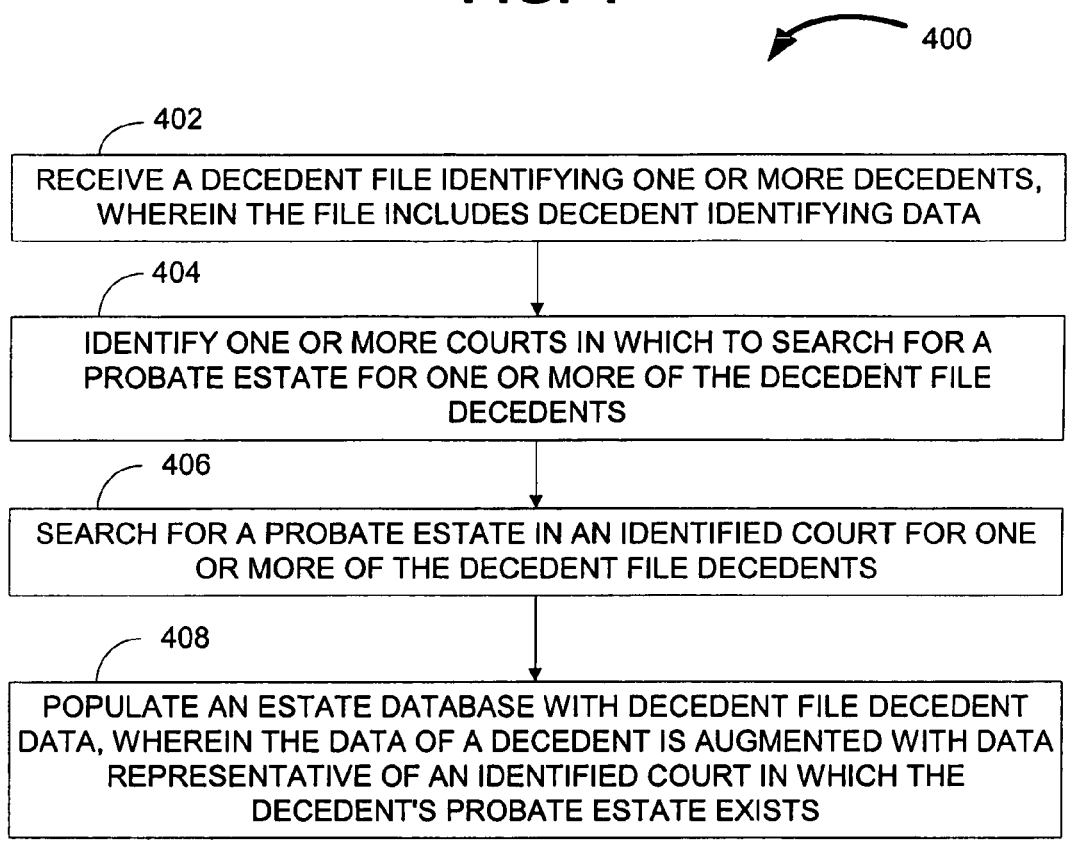

SYSTEMS AND METHODS TO COLLECT AND AUGMENT DECEDENT DATA

FIELD

The inventive subject mater relates to data processing and, more particularly, systems and methods to collect and augment decedent data.

BACKGROUND

The Death Master File ("DMF") maintained by the Social Security Administration ("SSA") is available from the Department of Commerce's National Technical Information Service ("NTIS"). Currently, the DMF contains over 65 million records of deaths that have been reported to SSA. This file contains the following information on each decedent, if the data are available to the SSA: social security number, name, date of birth, date of death, state or country of residence, ZIP code of last residence, and ZIP code of a lump sum payment made at death. However, the SSA does not have a death record for all persons. Therefore, SSA does not guarantee the veracity of the file. Thus, the absence of a particular person is not proof this person is alive.

However, many companies and other entities need as much data about decedents as they can obtain. Also, the veracity and quick availability of the obtained data is also crucial for many purposes.

BRIEF DESCRIPTION OF THE DRAWINGS

FIG. 4 is a block diagram of a method according to an example embodiment.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions, algorithms, and methods described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

The various embodiments described herein have several purposes. One such purpose includes collection, validation, and dissemination, or other use of data of decedents. Some embodiments include client debtor data and decedent data that is manipulated in the various embodiments to populate databases, validate database data, and retrieve data from various other contiguous and disparate sources.

Figure 1:
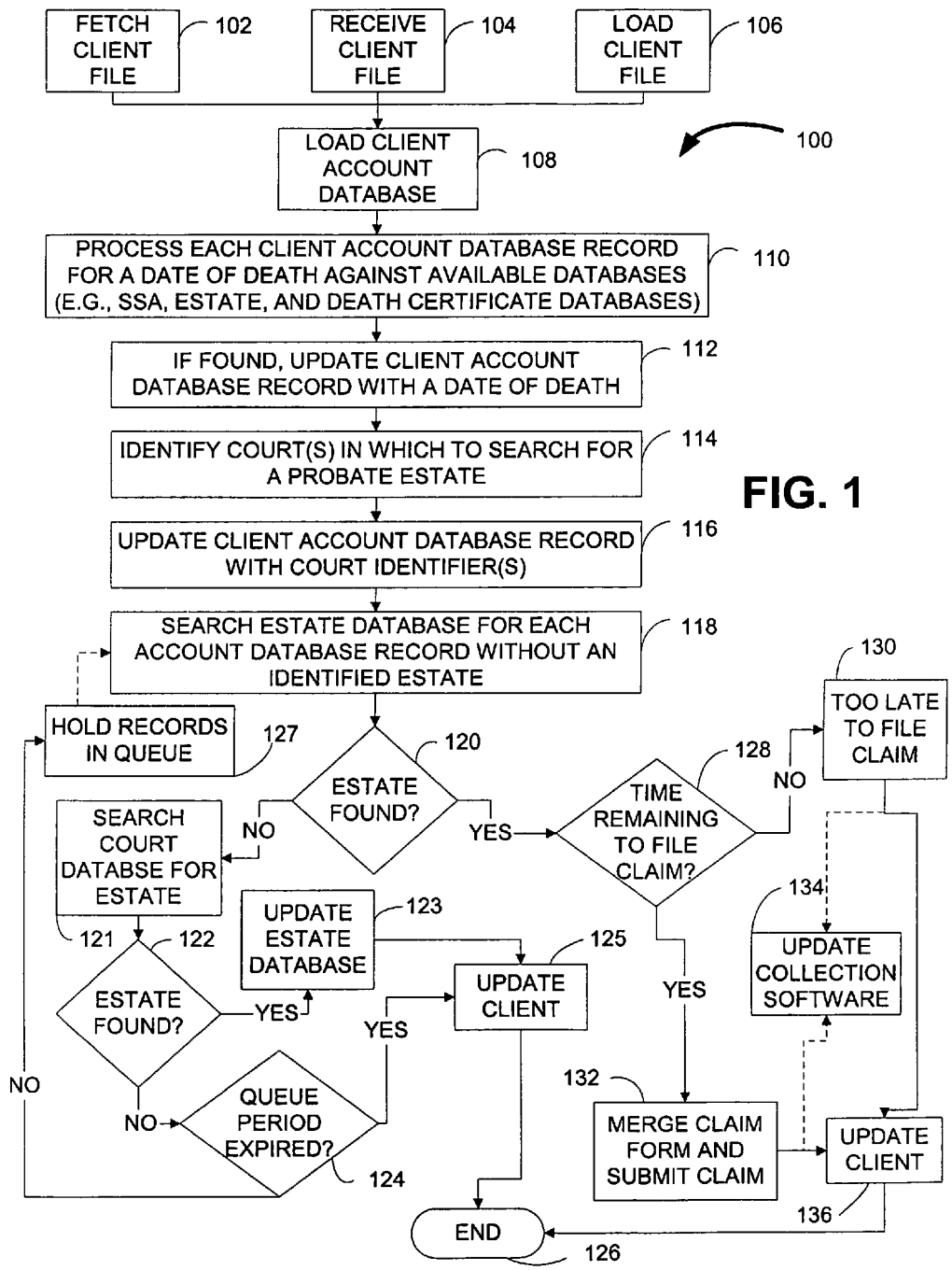
FIG. 1 is a flow diagram of a method according to an example embodiment.

FIG. 1 is a flow diagram of a method 100 according to an example embodiment. At a high-level, this method 100 operates to verify or determine that a client debtor is deceased, to locate a probate estate of the client debtor, and to facilitate the filing of a claim against the client debtor probate estate. At the same time, the method 100 operates to populate and update an estate database.

In some embodiments, the estate database includes data obtained from one or more sources. In various embodiments, these sources include data from the Social Security Administration, probate courts, newspaper obituaries, veteran records, death certificates, clients, and other sources from which data concerning decadents can be obtained. In some embodiments, the data from one of these sources is compared against data from another source to identify identical data and inconsistent data. Inconsistent data can then be manually or atomically processed to correct inconsistencies.

The method 100 processes client data. The client in this context is a source of data. The client can include an entity that lends money or a client of a data processing entity performing the method 100 on the client's data. The data is obtained from the client in any number of ways including fetching a client file 102 from a client over a network (, the client file is pulled), receiving a client file 104 over a network from the client (e.g., the client file is pushed), or loading a client file 106 from a tape, disk, or other computer readable medium (e.g., a file that is sent via standard mail, freight, or other shipping means). Some embodiments include obtaining the data as a flat file having defined record lengths, field delimiters, or other similar type file. Other embodiments include receiving the file encoded in a markup language such as eXtensible Markup Language ("XML"). Yet further embodiments include a data exchange arrangement utilizing a technology such as Electronic Data Interchange ("EDI"). Other methods, means, and mechanisms to obtain the client data can also be used.

After the data is obtained, the data is loaded into a client account database 108. The client account database 108 includes various items of data for each client account identified in the obtained data. In some embodiments, this data includes name, address, phone number, spouse data, next of kin contact information, outstanding balance amounts, a date of death (if known), and other personal and demographic information, based on the client and the particular embodiment.

Once the data is loaded into the client account database 108, each client account database record is processed for a date of death against one or more available databases 110. Such databases can include a database including data from the "Death Master File" maintained by the United States Social Security Administration ("SSA") and available from the United States Department of Commerce's National Technical Information Service ("NTIS"), an estate database including a record for many probate estates previously identified to be in certain courts, a death certificate database including data from death certificates, or other commercial, public, or proprietary data stored in a database including data about deceased individuals. In the event that a date of death is received from a client, that date of death is verified against the available databases. If a date of death is not identified by the processing 110, the method still proceeds. If a date of death is identified or verified, the respective client account database record is updated with the date of death 112.

The method 100 further includes identifying one or more courts in which to search for a probate estate 114 of each client account database record. In some embodiments, a court in which to search for a probate estate is identified at 114 based on address information in a client account database record. For example, one embodiment includes a court table in a database. The court table includes the columns city, state, zip, and court. The columns city, state, and zip form a unique key. Thus, when submitting a database query to select a court using the city, state, and zip code of an address as the key, the query will return a single court. In some embodiments, a city and state combination is sufficient. In yet other embodiments, a zip code or a zip+4 is sufficient. Example structured query language ("SQL") select statements are as follows:

```
SELECT court FROM court_table
WHERE
    city = x,           city = x,            zip = z;
    state = y,    OR    state = y; OR
    zip = z;
```

In the event a client account database record has more than one address, more than one court can be identified, one court for each unique city, state, zip combination, and subsequently searched for the probate estate.

Once one or more courts in which to search for a probate estate are identified 114, the respective client account database record is updated with one or more court identifiers 116. The court identifier can be a name and address of the court. In other embodiments, the identifier is a relational key into another table including the court information.

For each identified court at 114 of a client account database record without a previously identified court, the method 100 searches an estate database to locate the estate at 118. The estate database, in some embodiments, includes records of identified probate estates. The estate database, in some embodiments, is a proprietary database of an entity performing the method 100. In some embodiments, the estate database includes publicly available data from courts, newspapers, public notices, and from previous probate estate searches. Data from courts can be received directly from courts in an electronic form and as entered data resulting from manual searches performed at the courts. Newspaper and public notices are generally provided to the estate database via manual data entry, but in some circumstances, such data can be received in electronic form from one or more sources including the newspapers themselves. Results from previous probate estate searches are generally manually entered into the database as a result of data obtained by an electronic or mailed letter request for probate estate information from a court.

Following the search of the estate database 118, the method 100 determines if an estate has been found at 120. If an estate is not found, the method 100, in some embodiments, includes searching the court data for the estate at 121. If the estate is found at 122, the estate database is updated at 123 with data to identify the located estate, the client is updated 125, and the method 100 ends at 126. If, however, the search of the court database for the estate 121 does not find the estate 122, the method 100 determines whether a queue period has expired 124. If not, the client account record is placed in a hold records queue 127. Client account records are placed in the hold records queue 127 in the event that a probate estate is not identified for the client account record. The estate database is searched 118 for the client account records in the queue 127 on a recurring or periodic basis while the client account records remain in the queue 127. The periodic or recurring basis at which the client account records in the queue are searched 118 varies by the particular embodiment. Some embodiments include performing the queue 127 search 118 on a weekly or daily basis. The client account records remain in the queue, in some embodiments, for up to 52 weeks, unless a probate estate is identified in a particular court before the end of the 52 weeks. Other embodiments include maintaining the queued client account records for shorter and longer periods of time. If the queue period has expired at 124, the method 100 includes updating the client at 125 about that expiration and ending at 126 the method 100 for that client account database record.

Returning to the determination if an estate has been found at 120, if a probate estate is found, the method is also capable of determining if there is time remaining to file a claim at 128 against the probate estate. In some jurisdictions, claims against the estate of a decedent must be filed within a certain time frame, such as six or twelve months of a date, such as a date of death or date a probate estate comes before a court. These periods within which claims must be filed against an estate are normally established by jurisdictional statute. If there is time remaining, or if a client wants to file a claim regardless of the time period, the method 100 is capable of automatically merging a claim form and submitting the claim 132. In some embodiments, a claim form is customized based on requirements of a court to which the claim is submitted. In yet further embodiments, merging the claim form includes generating a data structure required for electronic filing by a court and submitting the claim electronically. Some embodiments include updating a debt collection software package 134 regarding the claim filing to cause any such actions in the collection software or changes in collection activity regarding the client account as desired to occur. The client is updated at 136 regarding the action taken. The method 100 then ends at 126 for that client account database record.

Returning to the determination if there is time remaining to file a claim at 128, and a claim has not been filed before the expiration of time, it is too late to file a claim 130. Some embodiments include updating the collection software package at 134 regarding the inability to file a claim against the estate to cause any such actions in the collection software or changes in collection activity regarding the client debtor account as desired to occur. The client is updated 136 regarding the action taken. The method 100 then ends 126 for that client account database record.

At this point, the method 100 has completed processing a client account database record. However, the method 100 continues to execute until all client account database records have been processed according to the method 100. The method 100 further continues to process records in the hold queue 127 on the periodic or recurring basis and client files continue to be loaded to the client account database 108 as they are obtained. Thus, the method 100 is typically an on going process.

At the end 126 of the method 100, the data in the estate database includes not only data from a single source, but from multiple sources. Most of this data in the estate database has been verified against these multiple source. Thus, this data is not only valuable to the client, but also to other clients, companies, and entities.

Figure 2:
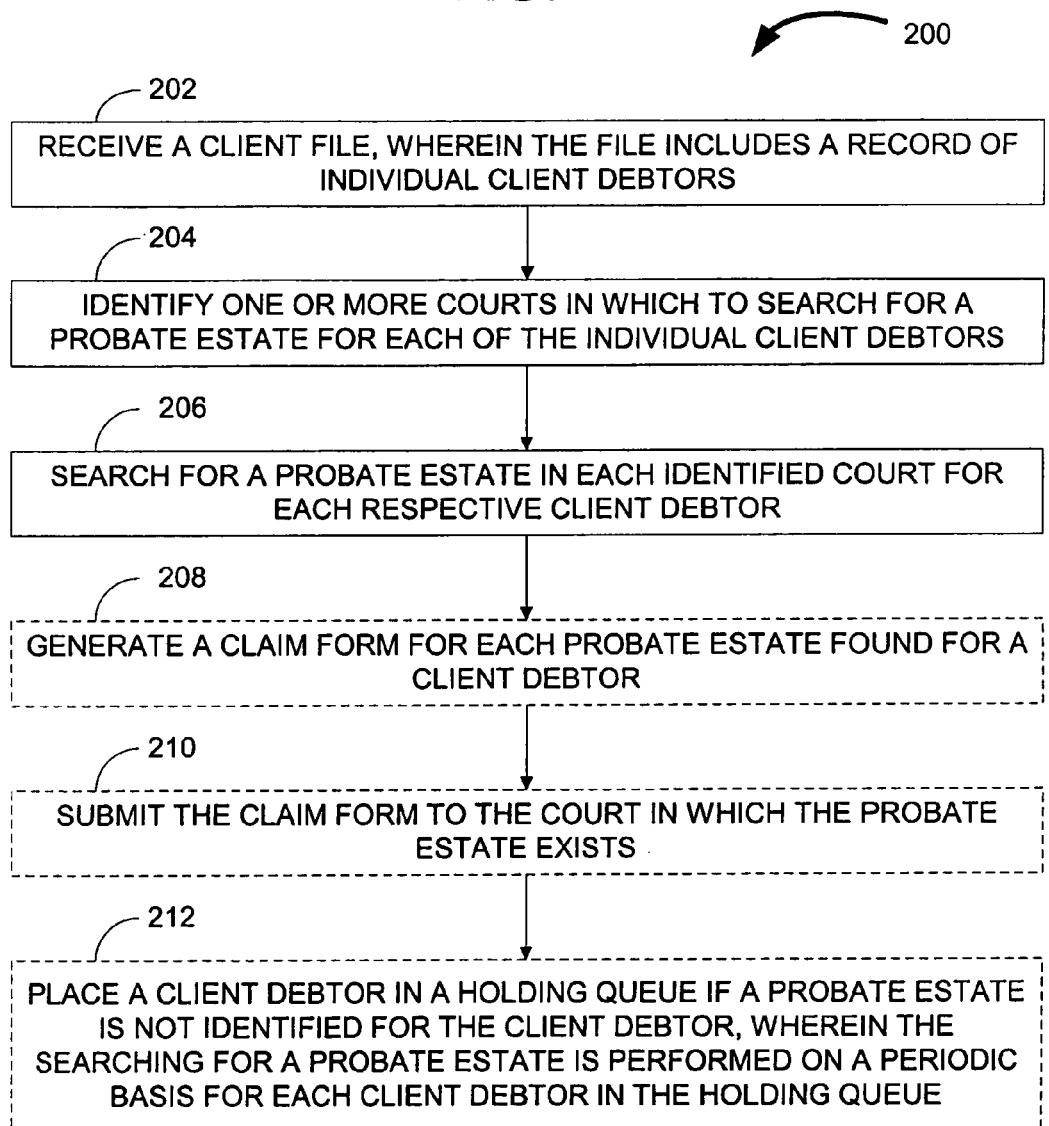
FIG. 2 is a block diagram of a method according to an example embodiment.

FIG. 2 is a block diagram of a method 200 according to an example embodiment. The method 200 operates to process data to identify probate estates and build an estate database, from which decedent data can be extracted for various purposes.

The method 200 includes receiving, or otherwise obtaining, a client file 202, wherein the file includes a record of individual client debtors, and identifying one or more courts in which to search for a probate estate for each of the individual client debtors 204. The method 200 further includes searching for a probate estate in each identified court for each respective client debtor 206. In some embodiments, if a court has not been identified for a client debtor 206, a global probate estate search can be made.

Some embodiments further include generating a claim form for each probate estate found for a client debtor 208 and submitting the claim form to the court in which the probate estate exists 210. In some embodiments, the claim form is generated and submitted for a client debtor only if the time to file a claim, statutory or otherwise, has not expired. If a probate estate is not identified for a client debtor, the client debtor is placed in a holding queue and the searching for a probate estate is performed on a recurring or periodic basis for a client debtor in the holding queue 212.

Figure 3:
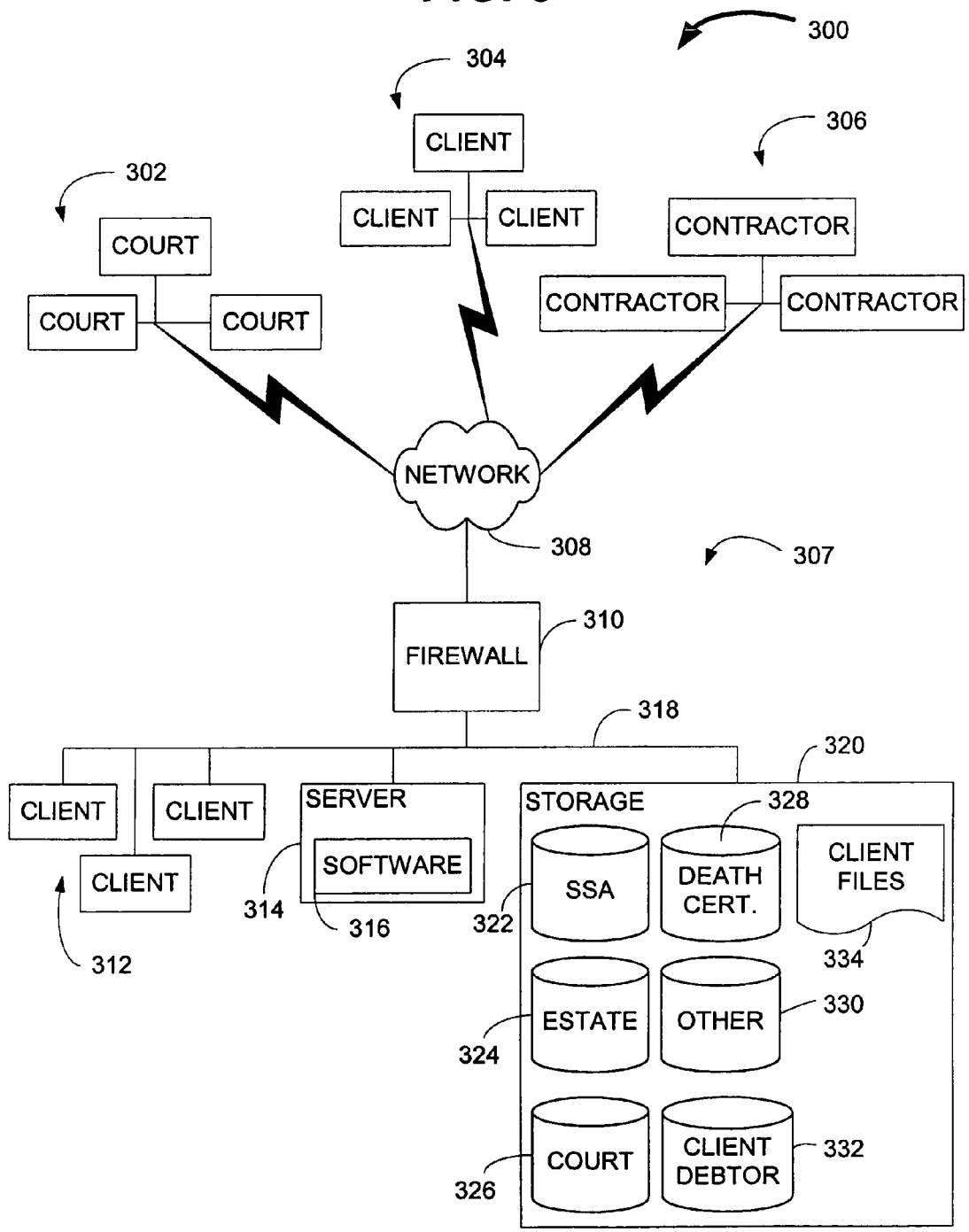
FIG. 3 is a block diagram of a system according to an embodiment.

FIG. 3 is a block diagram of portions of a system 300 according to an embodiment. FIG. 3 includes courts 302, clients 304, contractors 306 and a service entity 307 operatively interconnected via a network 308.

The courts 302 are courts in which probate estates of decedents are handled. The clients 304 are clients of the service entity 307 and generally lend money, or otherwise provide credit, to debtors. The service entity 307 is an entity that provides services related to the methods and system described herein to locate and identify probate estates of deceased debtors of client 304. The contractors 306 are optional contract employees or other representatives of the service entity 307 that perform manual probate estate searches and other services for the service entity 307 and provide resulting data to the service entity 307.

The network 308, in some embodiments in the Internet. In other embodiments, the network is a value added network ("VAN"), a proprietary network, virtual private network ("VPN"), a public switched telephone network ("PSTN"), a wired network, a wireless network, a wide area network, a global network, or network of another type capable of providing data connectivity between the courts 302, the clients 304, the contractors 306, the service entity 307, and other entities as needed for a particular embodiment or application of the present subject matter.

The service entity typically includes a firewall 310 that protects a local area network 318. The local area network 318 interconnects client computers 312, a server 314, a storage device 320, and other devices as needed, or otherwise selected, by the service entity 307.

The storage device 320 represents one or more machines capable of storing data. In some embodiments, the storage device 320 includes one or more machines, such as database and file servers, holding databases and files which are available to other devices and machines on the local area network 318. In some embodiments, the storage device stores client files 334 and databases 322, 324, 326, 328, 330, and 332.

The client files 334 are typically received, or otherwise obtained, from clients 304. In some embodiments, the client files 334 include data of client debtors that are believed to be deceased. In other embodiments the client files 334 also include data of client debtors that a client has not been able to contact or otherwise wants to learn if or when a client debtor dies.

The data in a client file can vary between clients 304. However, some of the data can include some or all of a client debtor name, address, secondary address, phone number, social security number, spouse data, next of kin data, and other personal and demographic data as may be known and provided by the clients 304.

The databases stored in the storage device 320 can vary between embodiments. However, some embodiments include one or more of the following:

Social Security Administration Database 322—this database includes public data obtained from the Social Security Administration. This data includes social security numbers of decedents and other personal and demographic information that can be useful in determining if an individual has passed.

Death Certificate Database 328—This database includes data obtained from one or more of issuers of death certificates, data obtained from contractors 306 that search death certificate records and provide data over the network 308, and death certificates that are received by the service entity 307. This data can include a decedent names, place of death, and date of death.

Estate Database 324—This database includes data regarding probate estates that have been established for probate or have completed the probate status. Estates in the estate database 324 specify a court having jurisdiction.

Court Database 326—This table includes data identifying courts that have jurisdiction over probate estates in certain geographic areas. In some embodiments, the court database 326 provides a one-to-one relationship between a city, state, zip code combination and a single probate court. Thus, when determining what court in which to search for a probate estate, a decedents city, state, and zip can be used as a key as described above.

Client Debtor Database 332—This database includes data obtained from client files 334 and is updated by further data that is received and processed. In some embodiments, the client debtor database 332 includes data such as a social security number; one or more names including first, middle, and last names; an address specifying a street address, city, state, and zip code; date of death; and a court in which the probate estate exists.

Other Databases 330—This database reflects that some embodiments may need one or more further databases depending on the requirements for a specific embodiment.

It is to be noted that some of these databases can be combined into a single database, one or more tables within one or more databases, or other data structures depending on service entity 307 needs and resources that are available. Further note, that although the term database is utilized to describe the way in which the data is stored, the term database is intended as a broad term to encompass various data storage methods, including, but not limited to, relational databases, flat files, hierarchical databases, spreadsheets, text files, and other data storage structures, formats, and means.

The server 314 includes software 316 that executes to process data stored in the storage device 320. In some embodiments, the software 316 executes under command of one of the client computers 312. In other embodiments, the software executes on a continual basis to process data received, or otherwise obtained, by the service entity 307 and stored in the storage device 320.

In some embodiments, the software 316 executes on the server 314 to cause the server 314 to process client debtor data from the client debtor database 332 to determine if a client debtor is deceased and identify a court represented in the court database 326 in which a probate estate exists for the client debtor. The software 316 further executes to cause the server 316 to update the client debtor data in the client debtor database 332 to include the identified court and generate a claim against the probate estate of the client debtor on behalf of one of the clients 304. If a probate estate is not identified for a client debtor, the software places the client debtor in a holding queue for up to a certain period of time, such as 52 weeks. Client debtors that are in the holding queue are subsequently processed by the software 316 on a recurring basis, such as weekly, until a probate estate is identified or the maximum period of time to be in the holding queue has expired.

In some embodiments, identifying a court in which a probate estate exists includes comparing data from a client debtor database record to data in estate database records. In some embodiments, identifying a probate estate involves finding a match between one or more fields of an estate database record and a client debtor database record. Such matches, in various embodiments include a social security number match, a combination social security number and name match, or a match between one or more other fields. In some embodiments, a soundex algorithm is used to identify matches between names, or other text fields, to accommodate for misspellings. In some embodiments, a scoring algorithm is used. An example of such a scoring algorithm is assigning values to fields to be matched. The score for a field is accumulated based on identified field matches. If a score sum meets or exceeds a threshold value, a match is found, or assumed.

In some embodiments, when a client debtor is placed in a holding queue, a message is sent by the software 316 to one or more of the contractors 306 over the network 308, or other transmission means, to perform a manual search of an identified court from the court database 326 in which to search for the probate estate. In other embodiments, when a client debtor is placed in the holding queue, a letter to the identified court is generated by the software 316 with a request for any available probate information relating to the client debtor.

FIG. 4 is a block diagram of a method 400 according to an example embodiment. In some embodiments, the method 400 includes receiving a decedent file identifying one or more decedents 402, wherein the file includes decedent identifying data, and identifying one or more courts in which to search for a probate estate for one or more of the decedent file decedents 404. The example method 400 further includes searching for a probate estate in an identified court for one or more of the decedent file decedents 406 and populating an estate database with decedent file decedent data 408, wherein the data of a decedent is augmented with data representative of an identified court in which the decedent's probate estate exists.

In some embodiments, the decedent file is a SSA Death Master File. In other embodiments, the decedent file is client file identifying one or more individuals that are deceased or believed to be deceased, a file identifying probated estates of one or more decedents, an insurance company file identifying one or more deceased individuals, a file generated by a public health entity identifying decedents, or other file from virtually any identify with knowledge or belief of an individual's deceased status.

Some embodiments of the present subject matter further include extracting a decedent data file from a client debtor database, an estate database, or other database maintained, generated, populated, or otherwise manipulated by the systems, methods, and software described herein. In some embodiments, the decedent data is made available directly from one or more of these databases in which the decedent data exists. In some embodiments, the decedent data is made available from databases or files over a network such as the Internet.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A computer implemented method comprising:
  receiving a decedent file identifying millions of decedents, wherein the file includes decedent identifying data;
  identifying one or more courts in which to search for a probate estate for one or more of the decedent file decedents as a function of address information for the one or more decedents;
  searching for a probate estate in an identified court for one or more of the decedent file decedents; and
  when a probate estate is located within an identified court, populating an estate database with decedent file decedent data, wherein the data of a decedent populated into the estate database is augmented with data representative of the identified court in which the decedent's probate estate is located, data from public notices, and data from courts.

2. The computer implemented method of claim 1, wherein the decedent file is a Death Master File maintained by the United States Social Security Administration.

3. The computer implemented method of claim 2, wherein the Death Master File identifies decedents by one or more of:
  a social security number,
  a name,
  a date of birth, a date of death,
a state or country of residence,
a ZIP code of last residence, and
a ZIP code of a lump sum payment made at death.

4. The computer implemented method of claim 1, comprising:
   placing a decedent file decedent in a holding queue with multiple other decedent files if a probate estate is not identified for the decedent, wherein the searching for a probate estate is performed on a recurring basis for each decedent in the holding queue.

5. The computer implemented method of claim 4, wherein the recurring basis is a daily basis.

6. The computer implemented method of claim 4, wherein a plurality of decedent files remain in the holding queue for a period, after which if a probate estate is not identified for the decedent, the decedent is removed from the holding queue.

7. The computer implemented method of claim 6, wherein the period of time that a decedent remains in the holding queue is two years.

8. The computer implemented method of claim 1, comprising:
   receiving decedent data from a probate court;
   matching the probate court decedent data to one or more decedents in the estate database by use of field match scoring and threshold comparison; and
   storing the probate court decedent data with its matched estate database decedent data.

9. A computer-readable storage medium, with instructions thereon which when processed result in a machine:
   receiving a decedent file identifying one or more decedents, wherein the file includes decedent identifying data;
   identifying one or more courts in which to search for a probate estate for one or more of the decedent file decedents;
   searching for a probate estate in an identified court for one or more of the decedent file decedents; and
   when a probate estate is located within an identified court, populating an estate database with decedent file decedent data, wherein the data of a decedent populated into the estate database is augmented with data representative of the identified court in which the decedent's probate estate is located.

10. The computer-readable storage medium of claim 9, wherein the decedent file is a Death Master File maintained by the United States Social Security Administration.

11. The computer-readable storage medium of claim 10, wherein the Death Master File identifies decedents by one or more of:
   a social security number,
   a name,
   a date of birth,
   a date of death,
   a state or country of residence,
   a ZIP code of last residence, and
   a ZIP code of a lump sum payment made at death.

12. The computer-readable storage medium of claim 9, comprising:
   placing multiple decedent file decedents in a holding queue if a probate estate is not identified for the decedent, wherein the searching for a probate estate is performed on a recurring basis for each decedent in the holding queue.

13. The computer-readable storage medium of claim 12, wherein the recurring basis is a weekly basis.

14. The computer-readable storage medium of claim 12, wherein a decedent remains in the holding queue for a period, after which if a probate estate is not identified for the decedent, the decedent is removed from the holding queue.

15. The computer-readable storage medium of claim 14, wherein the period of time that a decedent remains in the holding queue is one year.

16. The computer-readable storage medium of claim 9, wherein the instructions further result in the machine:
   receiving decedent data from a probate court in a variety of electronic media;
   matching the probate court decedent data to one or more decedents in the estate database; and
   storing the probate court decedent data with its matched estate database decedent data.

17. A computer implemented method comprising:
   receiving multiple client account database records corresponding to decedents;
   processing one or more decedent client account database records against a decedent file identifying millions of decedents, wherein the decedent file includes decedent identifying data and updating the decedent client account database records with dates of death if found;
   identifying one or more courts in which to search for a probate estate for one or more of the decedent client account database records as a function of address information for the one or more decedents and updating the decedent client account database records with the one or more identified courts;
   searching for a probate estate in an identified court for one or more of the decedents; and
   when the searching identifies a probate estate within an identified court, populating an estate database with updated decedent client account database records, wherein the data of a decedent populated into the estate database is augmented with data representative of the identified court in which the decedent's probate estate is located, data from public notices, and data from courts.

* * * * *